(12) United States Patent
Urabe

(10) Patent No.: US 7,623,708 B2
(45) Date of Patent: Nov. 24, 2009

(54) COLOR IMAGE COLOR SHIFT CORRECTION METHOD AND COLOR IMAGE IMAGING APPARATUS

(75) Inventor: Hitoshi Urabe, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 854 days.

(21) Appl. No.: 11/114,106

(22) Filed: Apr. 26, 2005

(65) Prior Publication Data

US 2005/0251019 A1 Nov. 10, 2005

(30) Foreign Application Priority Data

Apr. 27, 2004 (JP) ............................. 2004-131427
Feb. 14, 2005 (JP) ............................. 2005-036769

(51) Int. Cl.
*G06K 9/00* (2006.01)
(52) U.S. Cl. ...................... 382/167; 348/267; 348/270; 348/273
(58) Field of Classification Search ................. 382/167
See application file for complete search history.

(56) References Cited

U.S. PATENT DOCUMENTS

| 4,908,720 | A | * | 3/1990 | Nagumo | 348/263 |
| 5,084,761 | A | * | 1/1992 | Nitta | 348/270 |
| 5,251,271 | A | * | 10/1993 | Fling | 382/162 |
| 5,268,753 | A | * | 12/1993 | Yamaguchi | 358/527 |
| 5,406,066 | A | * | 4/1995 | Steinle et al. | 250/208.1 |
| 5,532,742 | A | * | 7/1996 | Kusaka et al. | 348/264 |
| 5,555,106 | A | * | 9/1996 | Hsu | 358/512 |
| 5,987,169 | A | * | 11/1999 | Daly et al. | 382/167 |
| 6,037,584 | A | * | 3/2000 | Johnson et al. | 250/235 |
| 6,075,514 | A | * | 6/2000 | Ryan | 345/601 |
| 6,157,735 | A | * | 12/2000 | Holub | 382/167 |
| 6,194,109 | B1 | * | 2/2001 | Lawton | 430/47.1 |
| 6,208,753 | B1 | * | 3/2001 | Braudaway et al. | 382/162 |
| 6,571,021 | B1 | * | 5/2003 | Braudaway | 382/275 |
| 7,110,687 | B2 | * | 9/2006 | Furukawa | 399/49 |
| 2003/0067615 | A1 | * | 4/2003 | Kawakami et al. | 358/1.9 |
| 2005/0206934 | A1 | * | 9/2005 | Nishikawa et al. | 358/1.9 |

(Continued)

FOREIGN PATENT DOCUMENTS

JP 3-146024 A 6/1991

(Continued)

*Primary Examiner*—Matthew C Bella
*Assistant Examiner*—Sath V Perungavoor
(74) *Attorney, Agent, or Firm*—Birch, Stewart, Kolasch & Birch, LLP

(57) ABSTRACT

Color shift correction comprising: (a) imaging an object and acquiring image data of each of a plurality of color planes including planes of primaries; (b) determining whether a color of each of pixels of color image data obtained by combining the image data of each of the plurality of color planes is imaginary; (c) counting the number of pixels determined in step (b) to have imaginary color and calculating the number of pixels within one frame which have imaginary color; (d) repeating a process of performing a pixel shift operation, relative to image data of each of the plurality of color planes, and performing steps (b) and (c) using the image data of each of the plurality of color planes having undergone the pixel shift operation, and obtaining, a pixel shift operation for the color planes; and (e) correcting the image data of the plurality of color planes on the basis of the pixel shift operation.

12 Claims, 9 Drawing Sheets

U.S. PATENT DOCUMENTS

2005/0206980 A1* 9/2005 Nishikawa et al. .......... 358/518
2005/0251019 A1* 11/2005 Urabe ........................ 600/407
2007/0097461 A1* 5/2007 Ng et al. ..................... 358/504
2007/0116375 A1* 5/2007 Utsugi et al. ................ 382/264
2008/0279599 A1* 11/2008 Nagatsuka .................. 399/301
2009/0027567 A1* 1/2009 Nishimura et al. .......... 348/744

FOREIGN PATENT DOCUMENTS

| | | | |
|---|---|---|---|
| JP | 05183915 A | * | 7/1993 |
| JP | 6-217328 A | | 8/1994 |
| JP | 6-319143 A | | 11/1994 |

* cited by examiner

FIG.5

|   | | X | Y | Z | | | | |
|---|---|---|---|---|---|---|---|---|
| A | R | 41.19 | 21.19 | 1.84 | | | | |
|   | G | 35.71 | 71.5 | 11.84 | | | | |
|   | B | 17.99 | 7.14 | 95.04 | | | | |
|   | C | 53.78 | 78.72 | 106.97 | | | | |
|   | M | 59.26 | 28.42 | 96.97 | | | | |
|   | Y | 76.99 | 92.77 | 13.77 | | | | |
|   |   |   |   |   | L* | a* | b* | POSITIONAL SHIFT |
| B | R, C | 41.19 | 21.19 | 1.84 | 53.15681 | 80.29344 | 67.91353 | NO |
|   |   | 41.19 | 21.19 | 106.97 | 53.15681 | 80.29344 | -79.5816 | YES |
|   |   | 41.19 | 78.72 | 1.84 | 91.10745 | -83.2869 | 133.3457 | YES |
|   |   | 41.19 | 78.72 | 106.97 | 91.10475 | -83.2869 | -14.1495 | YES |
|   |   | 53.78 | 21.19 | 1.84 | 53.15681 | 115.4731 | 67.91353 | YES |
|   |   | 53.78 | 21.19 | 106.97 | 53.15681 | 115.4731 | -79.5816 | YES |
|   |   | 53.78 | 78.72 | 1.84 | 91.10745 | -48.1073 | 133.3457 | YES |
|   |   | 53.78 | 78.72 | 106.97 | 91.10475 | -48.1073 | -14.1495 | NO |
| C | C, M | 35.71 | 71.5 | 11.84 | 87.72736 | -86.3024 | 83.38106 | NO |
|   |   | 35.71 | 71.5 | 96.97 | 87.72736 | -86.3024 | -13.5781 | YES |
|   |   | 35.71 | 28.42 | 11.84 | 60.2663 | 32.06424 | 36.0344 | YES |
|   |   | 35.71 | 28.42 | 96.97 | 60.2663 | 32.06424 | -60.9247 | YES |
|   |   | 59.26 | 71.5 | 11.84 | 87.72736 | -19.9428 | 83.38106 | YES |
|   |   | 59.26 | 71.5 | 96.97 | 87.72736 | -19.9428 | -13.5781 | YES |
|   |   | 59.26 | 28.42 | 11.84 | 60.2663 | 98.42381 | 36.0344 | YES |
|   |   | 59.26 | 28.42 | 96.97 | 60.2663 | 98.42381 | -60.9247 | NO |
| D | B, Y | 17.99 | 7.14 | 95.04 | 32.12352 | 79.65675 | -108.162 | NO |
|   |   | 17.99 | 7.14 | 13.77 | 32.12352 | 79.65675 | -17.4157 | YES |
|   |   | 17.99 | 92.77 | 95.04 | 97.13418 | -200.562 | 3.925731 | YES |
|   |   | 17.99 | 92.77 | 13.77 | 97.13418 | -200.562 | 94.67166 | YES |
|   |   | 76.99 | 7.14 | 95.04 | 32.12352 | 258.6712 | -108.162 | YES |
|   |   | 76.99 | 7.14 | 13.77 | 32.12352 | 258.6712 | -17.4157 | YES |
|   |   | 76.99 | 92.77 | 95.04 | 97.13418 | -21.5471 | 3.925731 | YES |
|   |   | 76.99 | 92.77 | 13.77 | 97.13418 | -21.5471 | 94.67166 | NO |

COLOR IMAGE COLOR SHIFT CORRECTION METHOD AND COLOR IMAGE IMAGING APPARATUS

Applicant claims priority of Japanese applications, 2004-131427, filed on Apr. 27, 2004 and 2005-36769, filed on Feb. 14, 2005.

BACKGROUND OF THE INVENTION

1. Field of the Invention

The present invention relates to a color image color shift correction method and color image imaging apparatus and, more particularly, to a new technique for determining a color shift caused by a shift between color images of color planes such as RGB ones.

2. Description of the Related Art

Generally, a field sequential color image imaging apparatus rotates a rotary color filter with RGB color filters. Simultaneously with this, the apparatus images an object by a monochrome imaging apparatus through each color filter every time the color filter moves onto the optical axis of a photographing optical system and sequentially takes in images of respective colors. Then, the apparatus combines the images to obtain a color image.

A field sequential color image imaging apparatus of this type cannot ensure sufficient orthogonal accuracy of the plane of each color filter with respect to the photographing optical axis due to a swing of the rotation axis of the rotary color filter and the accuracy in attaching the color filter. For this reason, the position of an object image is shifted on the imaging surface according to the rotational position of the rotary color filter.

To solve this problem, a field sequential color camera described in Japanese Patent Application Laid Open No. 6-319143 finely displaces a two-dimensional solid state imaging element in response to displacement of an optical image caused by the rotation of a rotary color filter. More specifically, the invention described in Japanese Patent Application Laid Open No. 6-319143 focuses attention on that when the rotary color filter is tilted with respect to the photographing optical axis, the locus of a certain point of the optical image forms a circle on the imaging surface along with the rotation of the rotary color filter. According to the invention, the two-dimensional solid state imaging element is made to move in a circle in sync with the rotation of the rotary color filter.

Since sequential imaging is performed while switching between color filters, there is a shift, between the color filters, in the position of an object image on the imaging plane when the object is moving. Japanese Patent Application Laid Open No. 6-217328 discloses a technique for correcting a color shift by detecting a motion vector quantity between field sequential images and performing pixel shift for the images according to the motion vector quantity. In detecting the motion vector quantity between images, correlation calculation between the images is performed, and a vector quantity in which the correlation is the maximum is detected.

SUMMARY OF THE INVENTION

In the invention described in Japanese Patent Application Laid Open No. 6-319143, the plane of the rotary color filter is tilted with respect to the photographing optical axis by a predetermined angle, and the two-dimensional solid state imaging element is finely displaced according to a shift in an optical image caused by the rotation of the tilted rotary color filter. The invention is premised on that a shift on the imaging surface of the optical image is known from the rotational position of the rotary color filter. Accordingly, the invention described in Japanese Patent Application Laid Open No. 6-319143 cannot be applied to a case wherein an angle between the plane of a rotary color filter and a photographing optical axis randomly varies due to a swing of the rotation axis of the rotary color filter or a case wherein a shift occurs between field sequential images due to a factor other than the rotary color filter.

The detection of a shift amount (motion vector quantity) between field sequential images described in Japanese Patent Application Laid Open No. 6-217328 is performed on the basis of the correlation value obtained by the correlation calculation between the images. More specifically, the correlation value between the field sequential images is used as an evaluation value for the shift amount between the field sequential images.

In the case of a color image imaging apparatus of three-board (3CCD) type as well, a shift occurs between images obtained from three CCD image sensors due to a positional shift between the three CCD sensors.

The present invention has been made in consideration of the above-described circumstances, and has as its object to provide a color image color shift correction method and color image imaging apparatus which can evaluate a color shift between images of a plurality of color planes constituting a color image on the basis of a new evaluation value of the occurrence rate of imaginary color and can correct the color shift between the images on the basis of the evaluation result.

To attain the above-mentioned object, a color image color shift correction method according to the first aspect comprises:

(a) a step of imaging an object and acquiring image data of each of a plurality of coor planes including planes of primaries, (b) a step of determining whether a color of each of pixels of color image data obtained by combining the image data of each of the plurality of color planes is imaginary, (c) a step of counting the number of pixels determined in the step (b) to have imaginary color and calculating the number of pixels within one frame which have imaginary color, (d) a step of repeating a process of performing a pixel shift operation, relative to the image data of each of the plurality of color planes, for the image data of the remaining color planes and performing the steps (b) and (c) using the image data of each of the plurality of color planes having undergone the pixel shift operation, and obtaining, out of the pixel shift operations relative to the image data of the color planes, a pixel shift operation for the color planes in which the number of pixels which have imaginary color is the minimum, and (e) a step of correcting the image data of the plurality of color planes acquired in the step (a) on the basis of the pixel shift operation obtained in the step (d).

Generally, in optical images obtained by sequentially performing imaging while switching between color filters with respective colors or optical images on three CCD image sensors of 3CCD type, a pixel shift occurs on the imaging surface for each color. As a result, a color shift occurs in color image data obtained by combining image data of color planes. The invention according to the first aspect uses, as an evaluation value for evaluating such a color shift, the occurrence rate of imaginary color. More specifically, it is determined whether the color of each pixel of color image data obtained by combining image data of color planes is imaginary. Imaginary color is a color which exceeds the maximum chroma at a certain brightness (lightness) and certain hue or falls outside the locus of the maximum chroma (optimal color) and which cannot be recognized by humans. If a pixel shift occurs, the color of a pixel obtained from the values of primaries such as R, G, and B at the same position may be imaginary. For this reason, the number of pixels within one frame which have imaginary color is counted, and a pixel shift operation is performed for the image data of the color planes so as to minimize the number of pixels. The image data of the color planes acquired from a monochrome imaging device are corrected on the basis of the pixel shift operation thus obtained.

The second aspect is a color image color shift correction method of the first aspect, wherein the step (a) comprises imaging the object by a monochrome imaging device while switching between color filters with respective colors and acquiring field sequential image data.

The third aspect is a color image color shift correction method of the first aspect, wherein the step (a) comprises separating light incident from the object into color components of the primaries through a color separation optical system and acquiring the image data of the color planes from three monochrome imaging devices on which light beams with the respective color components come incident.

The fourth aspect is a color image color shift correction method according to any one of the first to third aspects, wherein the step (b) comprises a step of transforming color image data of the pixel into data in one of an LAB calorimetric system and XYZ colorimetric system and a step of, if the transformed data in the one of the LAB colorimetric system and XYZ colorimetric system falls outside a range of an optimal color of the one of a CIELAB chromaticity diagram and CIExy chromaticity diagram at a lightness of the pixel, determining that the color of the pixel is imaginary.

In the LAB calorimetric system or XYZ colorimetric system, all colors including imaginary color can be expressed in numerical values. If pixel data transformed into data in the one of the LAB calorimetric system and XYZ calorimetric system falls outside the range of the optimal color of the one of the CIELAB chromaticity diagram and CIExy chromaticity diagram, the color of the pixel is determined to be imaginary.

A color image imaging apparatus according to the fifth aspect comprises a monochrome imaging device, a color filter device which has color filters of at least primaries and sequentially switches to place one of the color filters onto a photographing optical path of the monochrome imaging device, an imaging control device which, when imaging an object, controls the color filter device and monochrome imaging device and acquires field sequential image data, a storage device which temporarily stores the acquired field sequential image data for each of color planes, a color shift detection device which detects a color shift on an imaging surface of the monochrome imaging device on the basis of the field sequential image data stored in the storage device, the color shift detection device comprising a device which performs a pixel shift operation, relative to the field sequential image data of each of the color planes stored in the storage device, for the field sequential image data of the remaining color planes and obtains the field sequential image data having undergone the pixel shift operation, a determination device which determines whether a color of each of pixels of color image data obtained by combining the field sequential image data having undergone the pixel shift operation is imaginary, a calculation device which counts the number of pixels determined by the determination device to have imaginary color and calculates the number of pixels within one frame that have imaginary color, and a device which detects, as a color shift, a pixel shift operation in which the number of pixels calculated by the calculation device is the minimum, and a color shift correction device which corrects a color shift in the field sequential image data stored in the storage device on the basis of the color shift detected by the color shift detection device.

More specifically, field sequential image data acquired by controlling the color filter device and monochrome imaging device is temporarily stored in the storage device. A color shift is detected in the above-described manner, using the field sequential image data stored in the storage device. The positions of the pixels of the color planes of field sequential image data are relatively corrected on the basis of a detected color shift, thereby correcting any color shift.

The sixth aspect is a color image imaging apparatus of the fifth aspect, wherein the color filter device comprises a rotary color filter disposed rotatably in front of a photographing optical system of the monochrome imaging device and a driving device which rotates the rotary color filter and stops each of the color filters on an optical axis of the photographing optical system.

A color image imaging apparatus according to the seventh aspect comprises a color separation optical system which separates object light incident through a photographic lens into color components of primaries, three monochrome imaging devices on which object light beams with the respective color components, having undergone the separation by the color separation optical system, come incident, an imaging control device which acquires image data of the primaries from the three monochrome imaging devices, a storage device which temporarily stores the acquired image data of the primaries for each of color planes, a color shift detection device which detects a color shift on imaging surfaces of the three monochrome imaging devices on the basis of the image data of each of the color planes stored in the storage device, the color shift detection device comprising a device which performs a pixel shift operation, relative to the image data of each of the color planes stored in the storage device, for the image data of the remaining color planes and obtains the image data of each of the color planes having undergone the pixel shift operation, a determination device which determines whether a color of each of pixels of color image data obtained by combining the image data of each of the color planes having undergone the pixel shift operation is imaginary, a calculation device which counts the number of pixels determined by the determination device to have imaginary color and calculates the number of pixels within one frame that have imaginary color, and a device which detects, as a color shift, a pixel shift operation in which the number of pixels calculated by the calculation device is the minimum, and a color shift correction device which corrects a color shift in the image data of each of the color planes stored in the storage device on the basis of the color shift detected by the color shift detection device.

The eighth aspect is a color image imaging apparatus described in any one of the fifth to seventh aspects, wherein the determination device of the color shift detection device comprises a data transformation device which transforms color image data of the pixel into data in one of an LAB calorimetric system and XYZ calorimetric system and a device which, if the transformed data in the one of the LAB calorimetric system and XYZ calorimetric system falls outside a range of an optimal color of one of a CIELAB chromaticity diagram and CIExy chromaticity diagram at a lightness of the pixel, determines that the color of the pixel is imaginary.

According to the present invention, a color shift between images of a plurality of color planes constituting a color image is evaluated by a new evaluation value of the occurrence rate of imaginary color, and a color shift between the images is detected on the basis of the evaluation result. For this reason, in cross-correlation between images of a plurality of color planes (images of different colors), a color shift can be detected at high accuracy even in a scene where high-accuracy color shift detection is difficult. A color image free from any color shift can be obtained.

BRIEF DESCRIPTION OF THE DRAWINGS

FIG. 5 is a table used to explain the occurrence of imaginary color;

DETAILED DESCRIPTION OF THE PREFERRED EMBODIMENTS

Preferred embodiments of a color image color shift correction method and color image imaging apparatus according to the present invention will be explained in detail below in accordance with the accompanying drawings.

Figure 1:
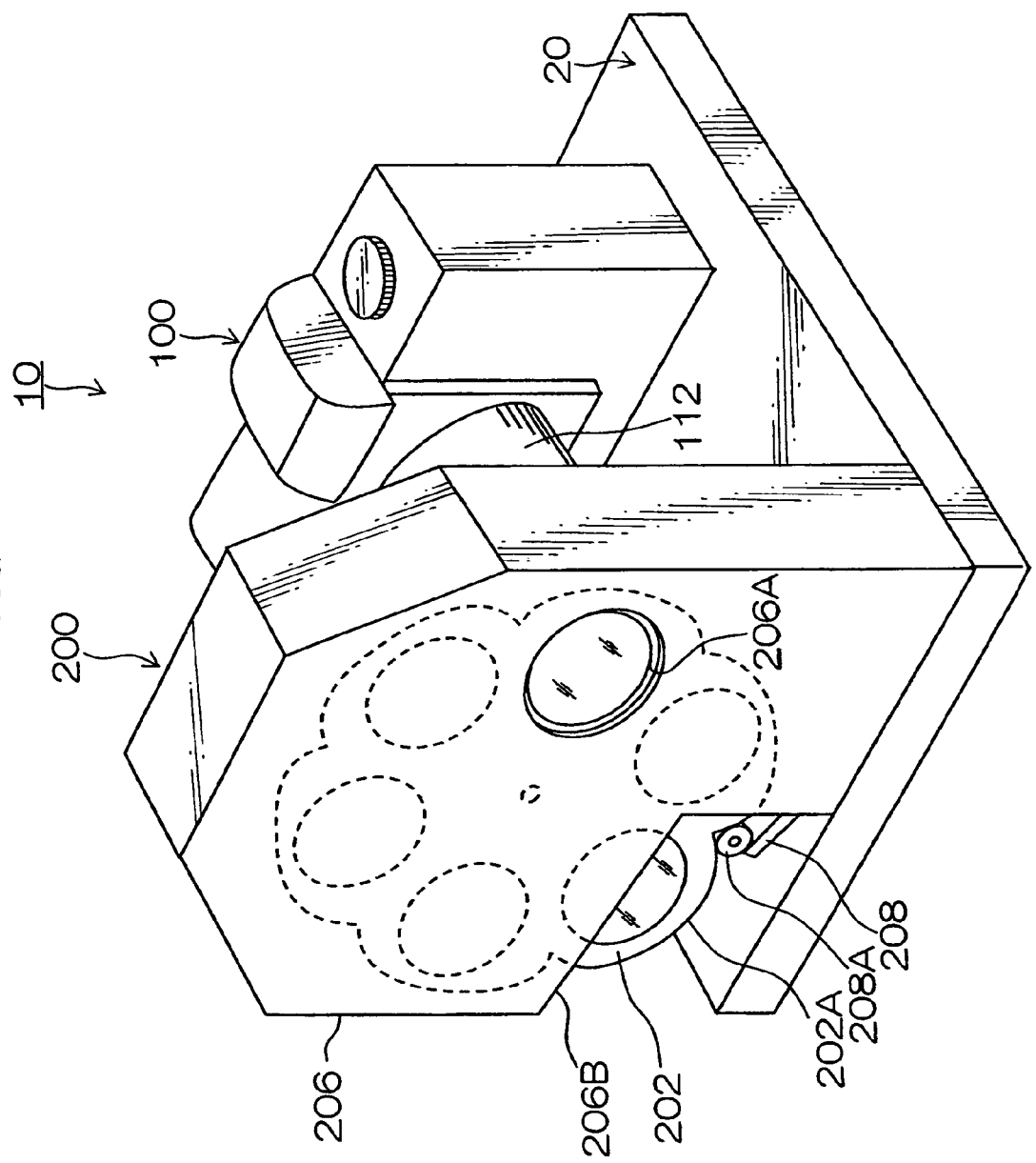
FIG. 1 is an external view showing an embodiment of a color image imaging apparatus according to the present invention.

FIG. 1 is an external view showing an embodiment of a color image imaging apparatus according to the present invention. As shown in FIG. 1, a color image imaging apparatus 10 is mainly composed of an imaging apparatus main body 100 and rotary color filter apparatus 200, both of which are disposed on a support base 20. The imaging apparatus main body 100 is fixed on the support base 20 through a pan-head mechanism (not shown), and this makes it possible to finely adjust the position and angle of the imaging apparatus main body 100 with respect to the rotary color filter apparatus 200.

The rotary color filter apparatus 200 is mainly composed of a turret plate 202 having color filters of R (Red), G (Green), B (Blue), C (Cyan), M (Magenta), and Y (Yellow), and a rotary driving device including a motor 204 (see FIG. 2) which electrically rotates the turret plate 202.

The turret plate 202 is covered with a cover 206 having openings 206A and 206B as its parts. The opening 206A of the cover 206 is formed at a position facing a photographic lens 112 of the imaging apparatus main body 100.

A cam 202A for positioning each color filter at a predetermined position (the position of the opening 206A of the cover 206) is formed around the perimeter of the turret plate 202. A roller unit 208A of a lever member 208 abuts against the cam 202A. The lever member 208 is urged such that the roller unit 208A at its end always elastically abuts against the cam 202A around the perimeter of the turret plate 202 and swings in accordance with the rotation (the cam 202A) of the turret plate 202. Accordingly, rotational movement of each color filter to the predetermined position can be detected by detecting the swing angle of the lever member 208 (i.e., that the roller unit 208A has reached a valley of the cam 202A). If the turret plate 202 is freed from rotation when the roller unit 208A of the lever member 208 has reached a valley of the cam 202A, the lever member 208 can accurately position the turret plate 202.

Figure 2:
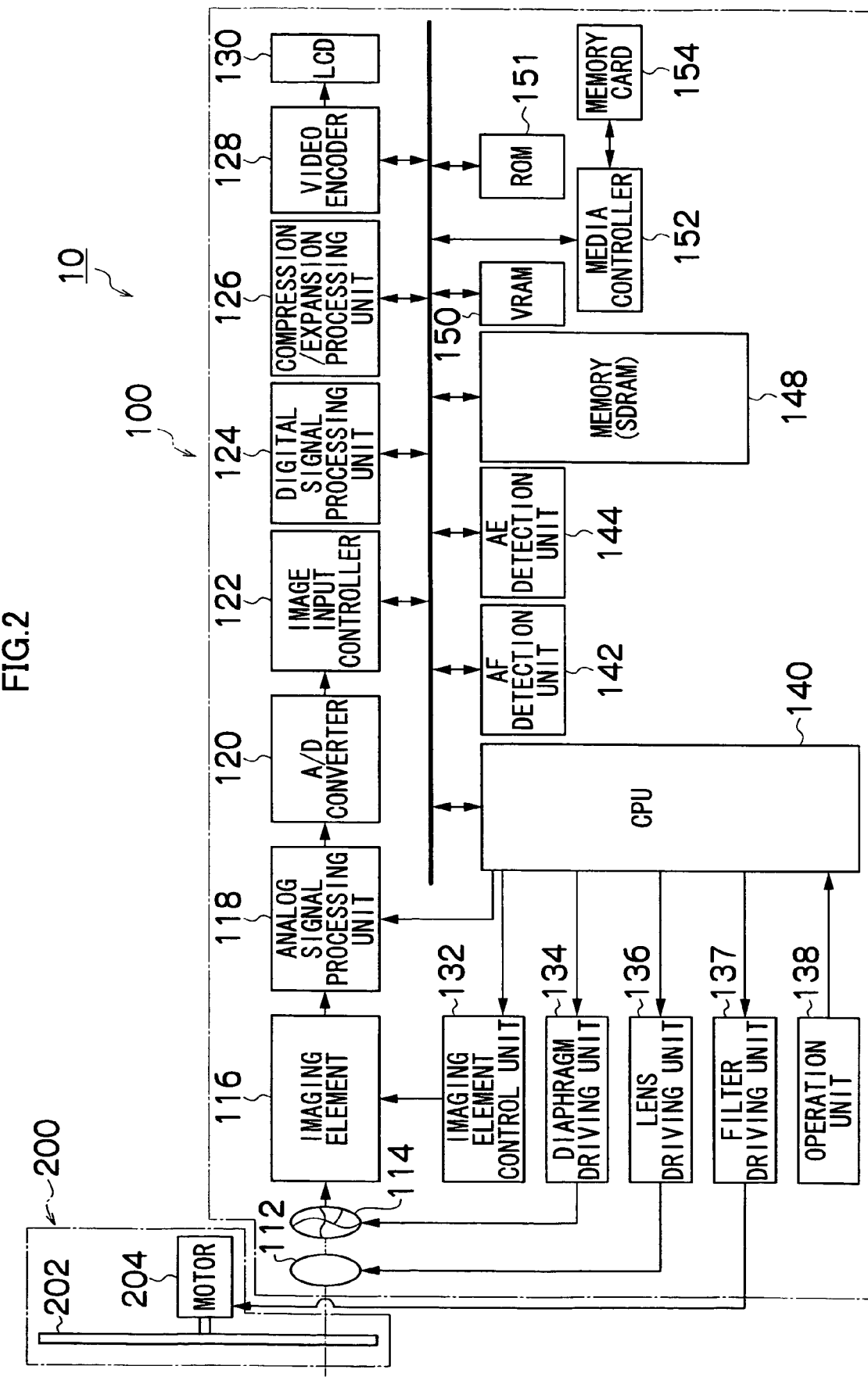
FIG. 2 is a block diagram showing the embodiment of the color image imaging apparatus shown in FIG. 1.

FIG. 2 is a block diagram showing the embodiment of the color image imaging apparatus 10.

As described above, the color image imaging apparatus 10 is composed of the imaging apparatus main body 100 and rotary color filter apparatus 200 and records, on a memory card 154, field sequential color images imaged through the rotary color filter apparatus 200. The operation of the entire apparatus is controlled by a central processing unit (CPU) 140. A program, an adjustment value, a graph of the optimal color in a CIELAB chromaticity diagram (to be described later), and the like are stored in advance in ROM 151. The program, adjustment value, graph, and the like are read, as appropriate.

The imaging apparatus main body 100 is provided with an operation unit 138 including a shutter button and a mode dial for setting a shooting mode, playback mode, and the like. A signal generated in response to an operation with the operation unit 138 is input to the CPU 140.

Image light representative of an object is imaged on the light-receiving surface of a monochrome imaging element 116 such as a CCD image sensor or CMOS image sensor through the rotary color filter apparatus 200, the photographic lens 112, and a diaphragm 114.

The turret plate 202 of the rotary color filter apparatus 200 is rotationally driven by the motor 204 and a filter driving unit 137 controlled by the CPU 140 and is controlled such that the next one of the color filters is located on the optical axis of the photographic lens 112 in every field sequential photographing operation.

The photographic lens 112 is driven by a lens driving unit 136 controlled by the CPU 140, thereby performing focus control and the like. The diaphragm 114 is composed of, e.g., five diaphragm blades and is driven by a diaphragm driving unit 134 controlled by the CPU 140. For example, the diaphragm 114 is controlled in five levels in increments of 1 Av so as to have an F number from F2.8 to F11.

The CPU 140 controls the diaphragm 114 through the diaphragm driving unit 134 and performs control of the charge storage time (shutter speed) in the monochrome imaging element 116 through an imaging element control unit 132 and other operations.

Signal charges stored in the monochrome imaging element 116 are read as voltage signals corresponding to the signal charges in accordance with a read signal applied from the imaging element control unit 132. The voltage signals read out from the monochrome imaging element 116 are applied to an analog signal processing unit 118. In the analog signal processing unit 118, the voltage signal of each pixel is sampled and held, amplified, and applied to an A/D converter 120. The A/D converter 120 converts a sequentially input analog signal into a digital signal, and the digital signal (image data) is temporarily stored in memory (SDRAM) 148 through an image input controller 122.

The image data stored in the memory 148 undergoes predetermined signal processes in a digital signal processing unit 124 and is then output to VRAM 150. The VRAM 150 includes an area A and area B, in each of which image data of one frame is stored. In the VRAM 150, image data representing an image of one frame is alternately rewritten in the areas A and B. Written image data is read out from one, out of the areas A and B of the VRAM 150, which is not one where image data is being rewritten. Image data read out from the VRAM 150 is encoded in a video encoder 128 and is output to a liquid crystal monitor 130 provided on the back of a camera. With this operation, an image of an object is displayed on the display screen of the liquid crystal monitor 130.

When the shutter button of the operation unit 138 is pressed to the first level (halfway pressed), AE operation and AF operation start. More specifically, image data output from the A/D converter 120 is received into an AF detection unit 142 and AE detection unit 144. The AF detection unit 142 uses image data (e.g., a signal in a central area (focus area) of the monochrome imaging element 116). The AF detection unit 142 extracts high-frequency components, through a high-pass filter (HPF), from the image data continuous in a one-dimensional (horizontal) direction and outputs, to the CPU 140, a value (AF evaluation value) obtained by integrating the high-frequency components. The AE detection unit 144 integrates image data of the entire frame or integrates image data in the center and periphery of the frame which are weighted differently, and outputs the integral value to the CPU 140.

The CPU 140 moves the photographic lens 112 through the lens driving unit 136 to a lens position where the AF evaluation value becomes maximum, on the basis of the AF evaluation value input from the AF detection unit 142, and calculates the brightness (photographic Ev value) of the object from the integral value input from the AE detection unit 144. On the basis of the photographic Ev value, the CPU 140 determines the F number of the diaphragm 114 and the electronic shutter (shutter speed) of the monochrome imaging element 116 in accordance with a predetermined program chart. The CPU 140 controls the diaphragm 114 through the diaphragm driving unit 134 on the basis of the determined F number and controls the charge storage time in the monochrome imaging element 116 through the imaging element control unit 132 on the basis of the determined shutter speed.

When the shutter button is pressed to the second level (fully pressed) after the AE operation and AF operation end, field sequential imaging is performed in response to the press. Field sequential image data of each color is temporarily stored in the memory 148 through the image input controller 122.

The CPU 140 corrects a color shift in the image data of each color stored in the memory 148. The details of a method for the color shift correction will be described later.

A digital signal processing unit 124 performs predetermined signal processes such as offset processing, gain control processing including white balance correction and sensitivity correction, gamma correction processing, and YC processing, for the image data of each color after the color shift correction. Image data having undergone the YC processing (YC data) is read from the digital signal processing unit 124 and stored again in the memory 148. Then, the YC data is output to a compression/expansion processing unit 126 and is subjected to a predetermined compression process such as one in JPEG (joint photographic experts group). The compressed YC data is again output to and stored in the memory 148. After that, the compressed YC data is read by a media controller 152 and recorded on the memory card 154.

In RAW data recording, image data (field sequential image data not having undergone signal processing and the like in the digital signal processing unit 124) which has been stored in the memory 148 through the image input controller 122 and has undergone color shift correction by the CPU 140 is directly recorded on the memory card 154.

A field sequential image data color shift correction method will be explained next.

Figure 3:
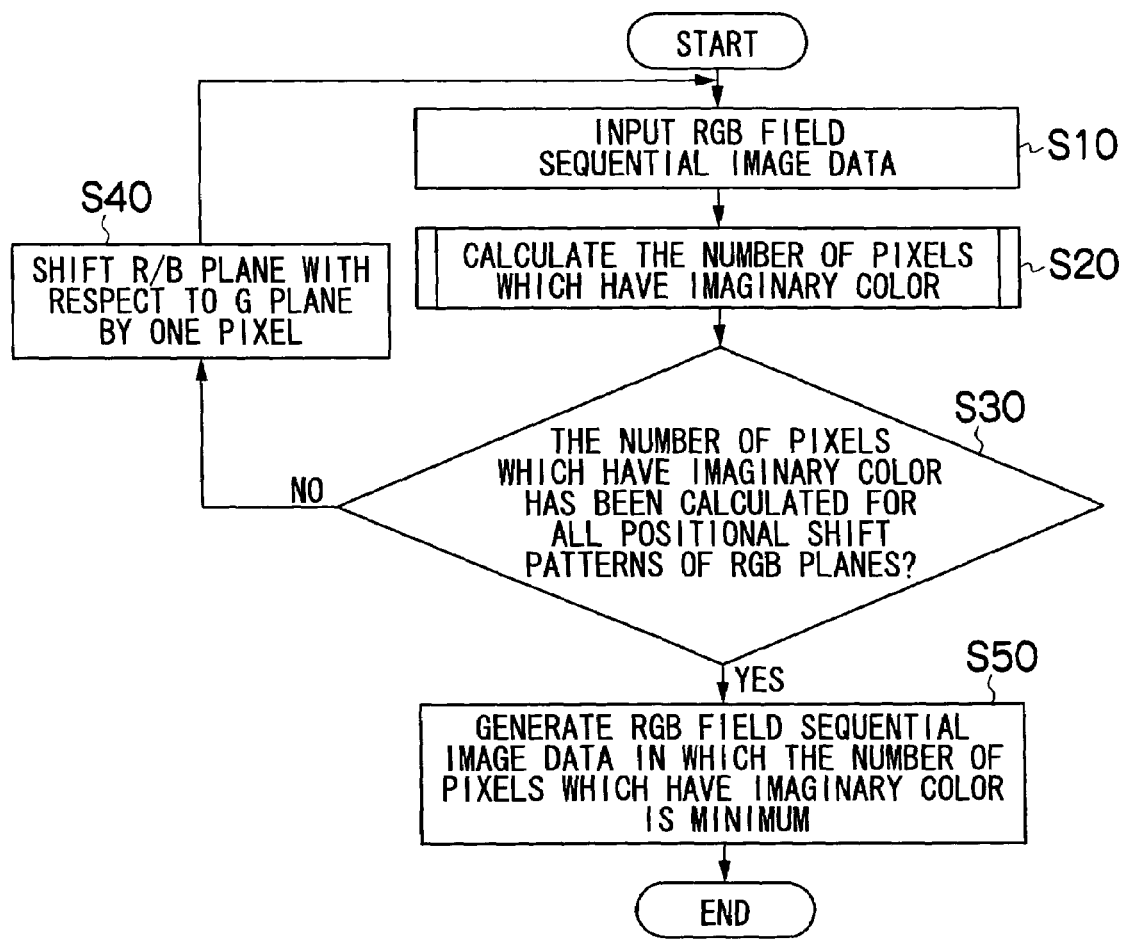
FIG. 3 is a flowchart showing an embodiment of a color image color shift correction method according to the present invention.

FIG. 3 is a flowchart showing an embodiment of a color image color shift correction method according to the present invention.

In FIG. 3, a CPU 140 obtains field sequential image data from memory 148 (step S10). Note that in this embodiment, a rotary color filter apparatus 200 switches between R, G, and B color filters at the time of field sequential imaging, and that RGB field sequential image data, i.e., three image data are stored in the memory 148.

The number of pixels which have imaginary color is calculated from the input RGB field sequential image data (step S20).

The reason why a pixel which has imaginary color occurs in a color image will be explained.

Combinations of colors which may be caused by a positional shift when the primary colors (RGB) and secondary colors (CMY) of the primaries approximate to the sRGB primaries are approximated in a complementary color relationship (R-C, G-M, and B-Y) are calculated.

CIE (Commission Internationale de l'Eclairage) colorimetric systems include the RBG system, XYZ (Yxy) system, and LAB system.

When the primary colors (RGB) and secondary colors (CMY) of the primaries approximate to the sRGB primaries are transformed into the XYZ system, as shown in FIG. 5, the transformation result is as shown in a part A of FIG. 5. The relationship between XYZ and RGB will be shown below.

[Formula 1]
$$\begin{pmatrix} R \\ G \\ B \end{pmatrix} = \begin{pmatrix} 3.2410 & -1.5374 & -0.4986 \\ -0.9692 & 1.8760 & 0.0416 \\ 0.0556 & -0.2040 & 1.0570 \end{pmatrix} \begin{pmatrix} 0.01 & 0.00 & 0.00 \\ 0.00 & 0.01 & 0.00 \\ 0.00 & 0.00 & 0.01 \end{pmatrix} \begin{pmatrix} X \\ Y \\ Z \end{pmatrix}$$

There are eight combinations of the tristimulus values X, Y, and Z of each pair of colors which are in a complementary color relationship (R-C, G-M, and B-Y), as shown in parts B, C, and D of FIG. 5. More specifically, if pixel colors in a complementary color relationship are mixed due to a pixel shift, a pixel of one of colors as shown in the parts B, C, and D of FIG. 5 occurs.

FIG. 5 also shows values obtained by transforming the XYZ system into the CIELAB system (also referred to as the L*a*b* system) defined by the CIE in 1976. The relationship between XYZ and CIELAB will be shown below.

[Formula 2]

$L^* 116(Y/Y_n)^{1/3} - 16$ $a^* = 500\{(X/X_n)^{1/3} - (Y/Y_n)^{1/3}\}$ $b = 200\{(Y/Y_n)^{1/3} - (Z/Z_n)^{1/3}\}$ where $X_n$, $Y_n$, and $Z_n$ are tristimulus values of standard light.

Figure 6:
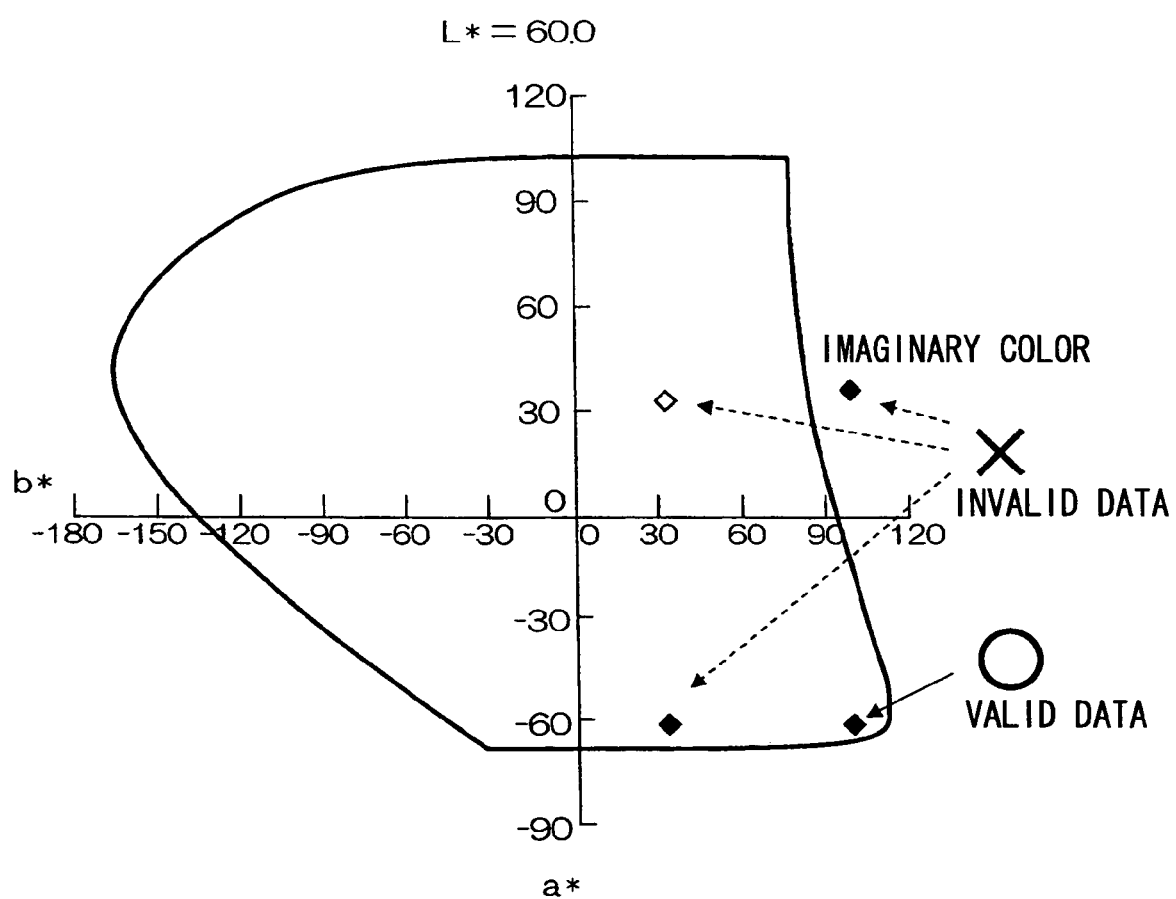
FIG. 6 is a CIELAB chromaticity diagram used to explain the occurrence of imaginary color.
Figure 7:
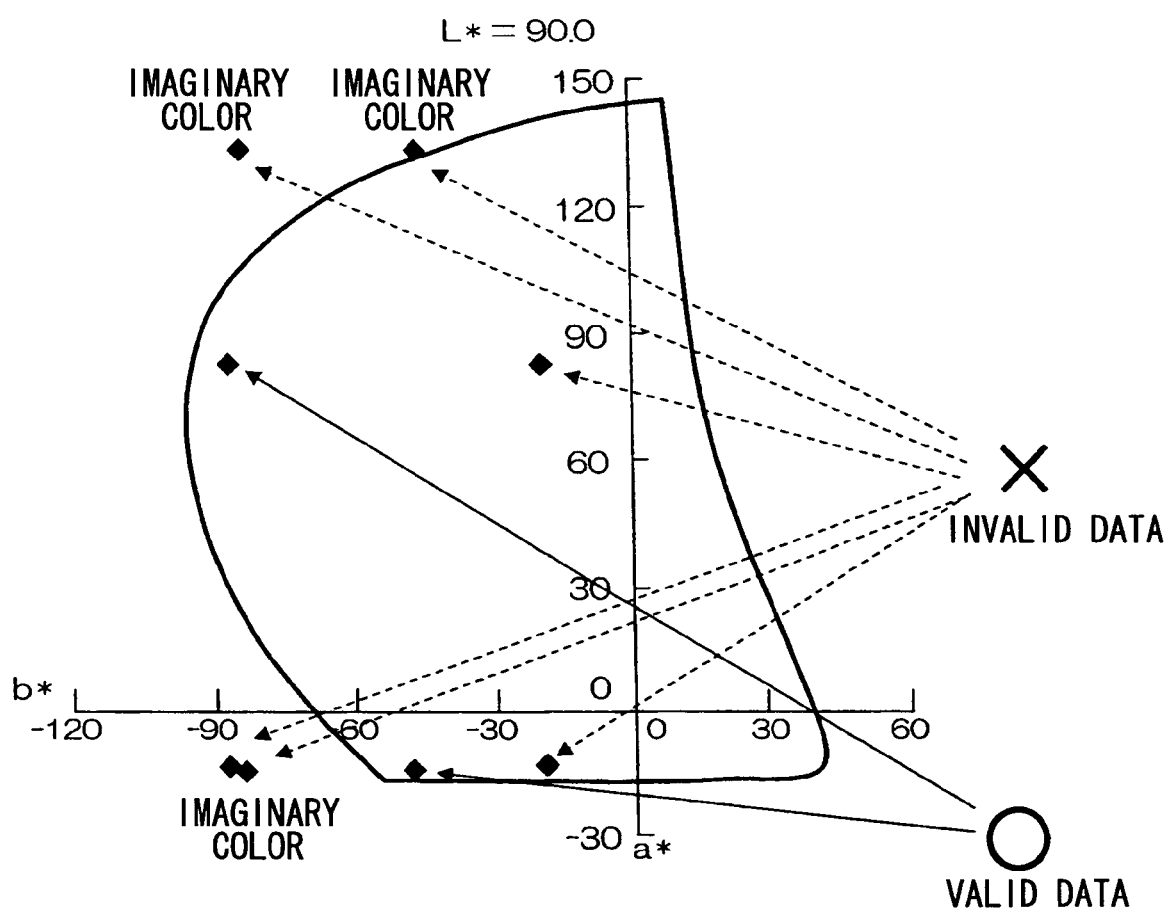
FIG. 7 is a CIELAB chromaticity diagram used to explain the occurrence of imaginary color.

FIGS. 6 and 7 are CIELAB chromaticity diagrams and show the locus of the optimal color at L*=60.0 and the locus of the optimal color at L*=90.0, respectively. Note that optimal color refers to the maximum lightness which three given spectral characteristics or primaries have at a certain brightness (lightness) and certain hue. The term "optimal color" is also used as the locus of the maximum chroma at the lightness and a different hue.

FIG. 6 shows the colors of four pixels with L*=60.2663 shown in FIG. 5. Three out of the four pixels each have a positional shift and have colors different from that of M. One of the three pixels has imaginary color outside the range of the optimal color.

Similarly, FIG. 7 shows the colors of eight pixels with L*=91.10745 and 87.72736 shown in FIG. 5. Six out of the eight pixels each have a positional shift and have colors different from those of C and G. Four out of the eight pixels have imaginary color outside the range of the optimal color.

More specifically, the color of each pixel is determined from the data of corresponding pixels at the same position of field sequential color planes. If a positional shift (pixel shift) occurs in the field sequential color planes, the color may be imaginary. Under the circumstances, in the present invention, the number of pixels which have imaginary color within one frame is counted, pixel shift is performed, with respect to each of the field sequential color planes, for the remaining color planes so as to minimize the number of pixels, thereby correcting any color shift. Note that if no positional shift occurs in the field sequential color planes, no imaginary color occurs.

Figure 4:
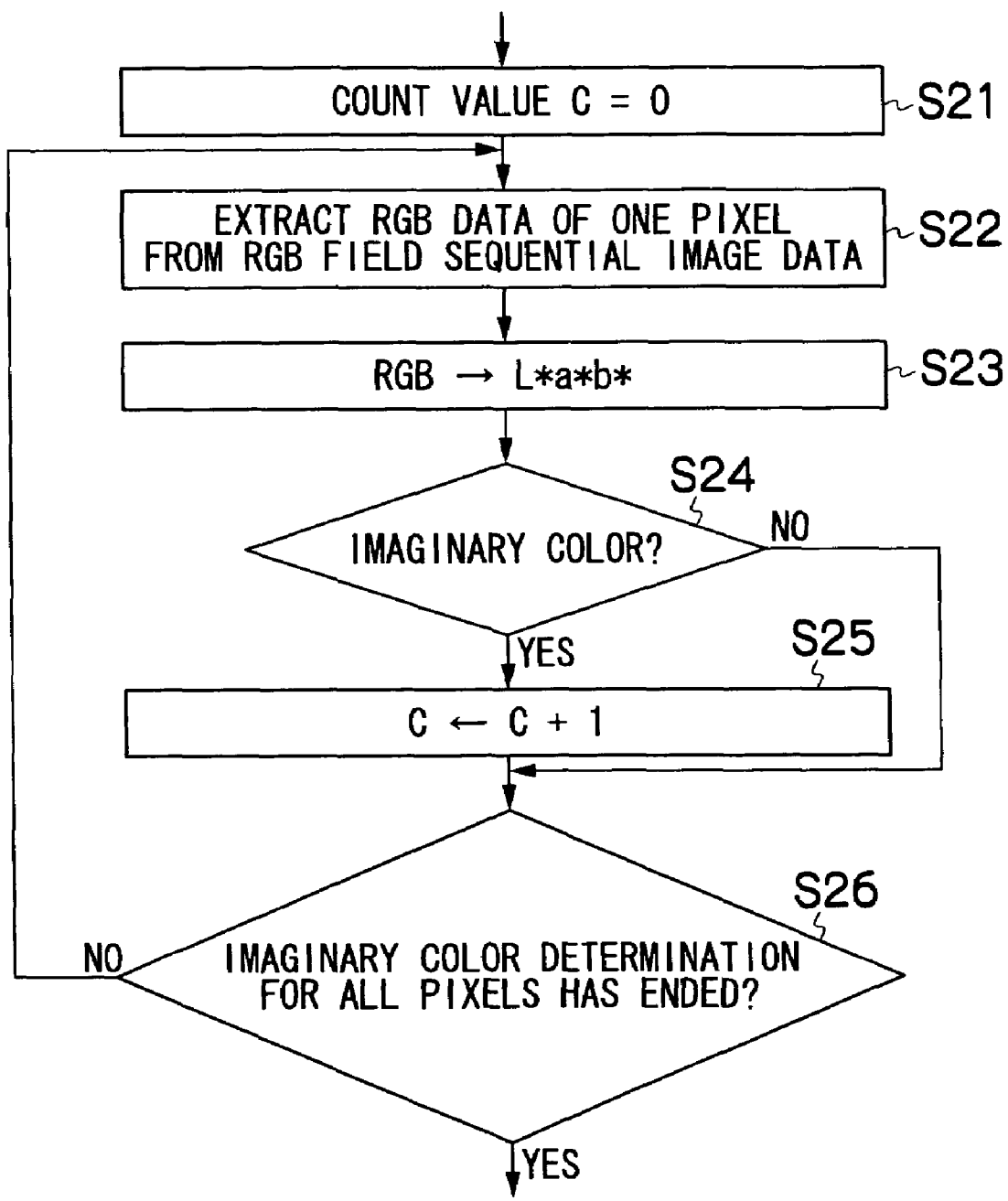
FIG. 4 is a flowchart showing the details of a process of calculating the number of pixels which have imaginary color shown in FIG. 3.

FIG. 4 is a flowchart showing the details of the process in step S20 shown in FIG. 3.

In FIG. 4, firstly, a count value C of a counter which counts the number of pixels that have imaginary color is reset to 0 (step S21). Then, R, G, and B data of one pixel are extracted from the RGB field sequential image data read in step S11 (step S22). The R, G, and B data are transformed into CIELAB (i.e., the values of L*, a*, and b*) (step S23). It is determined from the values of L*, a*, and b* after the transformation whether the pixel has imaginary color (step S24).

The imaginary color determination is performed in the manner below.

Using the values of L*, a*, and b* obtained in step S23, the values of C* and H* are obtained by the following formulae:

[Formula 3]

$$C^* = \sqrt{(a^{*2}+b^{*2})}$$

$$H^* = \tan^{-1}(b^*/a^*) \quad (3)$$

Figure 8:
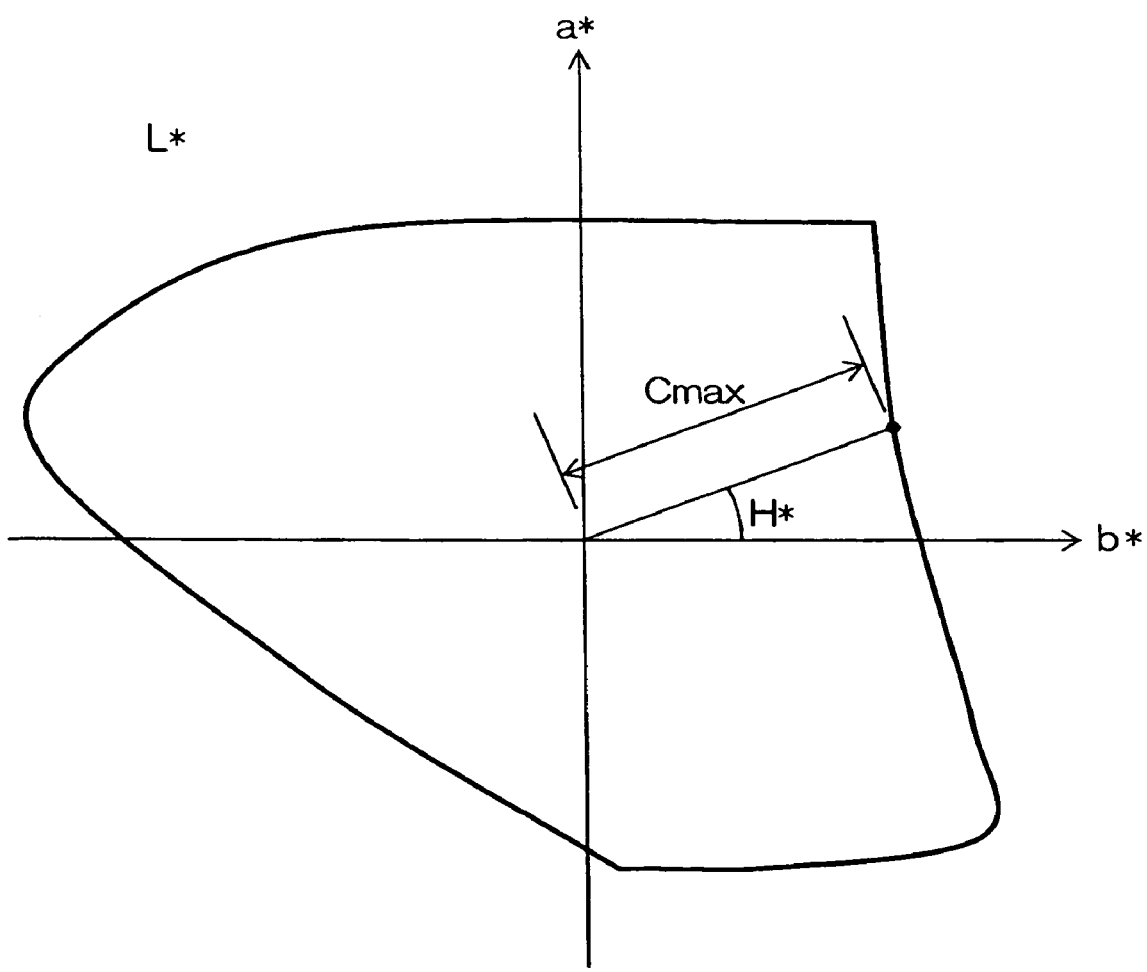
FIG. 8 is a CIELAB chromaticity diagram used to explain an imaginary color determination method.

FIG. 8 shows the locus of the optimal color at a certain L*. In FIG. 8, a maximum chroma $C_{max}$ at a hue H* is obtained from the locus of the optimal color. The value of C* obtained by formulae (3) is compared with the value of $C_{max}$. If $C_{max} < C^*$, the pixel is determined to have imaginary color.

Referring back to FIG. 4, if it is determined in step S24 that the pixel has imaginary color, the count value C is incremented by only one (step S25).

It is then determined whether imaginary color determination for all pixels of one frame has ended (step S26). If it is determined that the determination has not ended, the flow returns to step S22 to extract, from the one frame, a pixel different from the pixel extracted the last time. In this manner, the processes in steps S22 to S26 are repeated for all the pixels of the one frame, and the number of pixels which have imaginary color within one frame is calculated.

Referring back to FIG. 3, it is determined in step S30 whether the number of pixels which have imaginary color is calculated for all positional shift patterns of R, G, and B planes.

There are 25 positional shift patterns for pixels (one for each) of the R, G, and B planes. More specifically, a shift in one pixel of one plane has five patterns: none; one in the upward direction; one in the downward direction; one in the left direction; and one in the right direction. When one (e.g., the G plane) of the three R, G, and B planes is fixed, there are 25 (=$5^2$) ways in total of shifting the pixels (one for each) of the R and B planes. If the shift patterns further include one in the upper right direction, one in the lower right direction, one in the upper left direction, and one in the lower left direction, there are 81 (=$9^2$) patterns in total.

It is experimentally confirmed that in field sequential color planes imaged using the rotary color filter apparatus 200 of this embodiment, the R plane and B plane are shifted in parallel by about ½ to one pixel, and the G plane is rotated clockwise by about one pixel with respect to the R and B planes. To use a rotary color filter apparatus of this type, the number of pixels which have imaginary color only needs be calculated for the 25 or 81 positional shift patterns.

If it is determined in step S30 that the calculation of the number of pixels which have imaginary color for all the positional shift patterns of the R, G, and B planes has not ended, the R and B planes are shifted with respect to the G plane by one pixel (step S40), and the shifted RGB field sequential image data are input (step S1). By repeating the processes in steps S10 to S40, the number of pixels which have imaginary color is calculated for the 25 or 81 positional shift patterns of the RGB planes.

If it is determined in step S30 that the calculation of the number of pixels which have imaginary color for all the positional shift patterns of the R, G, and B planes has ended, the flow advances to step S50. In step S50, a positional shift for each of the R plane and B plane with respect to the G plane is obtained from a positional shift pattern of the R, G, and B planes in which the number of pixels which have imaginary color is the minimum, thereby generating RGB field sequential image data having undergone positional shift correction. The correction of the positional shifts in the RGB field sequential image data can be performed by, e.g., changing the address indicating the position of each pixel of the image data of the R plane and B plane stored in the memory 148 on the basis of the obtained positional shifts.

Figure 9:
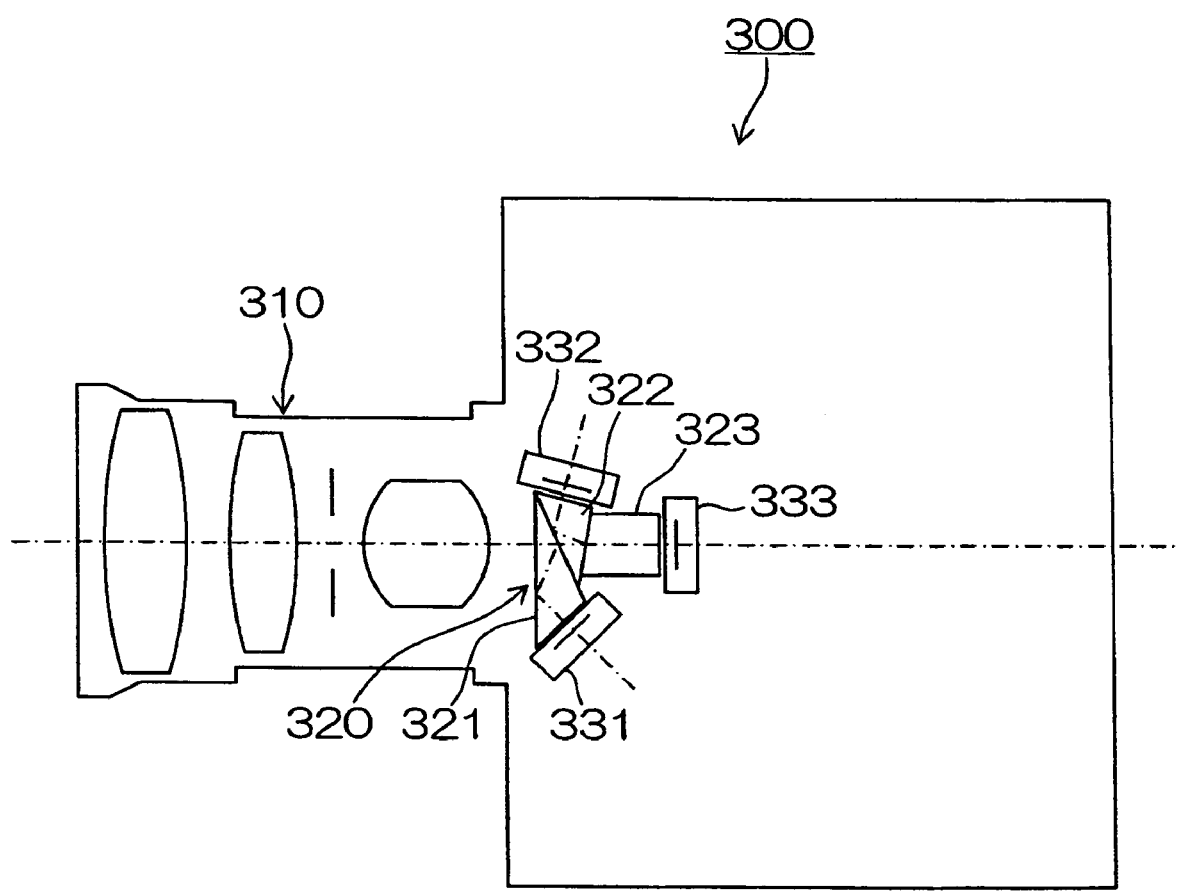
FIG. 9 is a view of the arrangement showing another embodiment of a color image imaging apparatus according to the present invention.

FIG. 9 is a view of the arrangement showing another embodiment of a color image imaging apparatus according to the present invention.

As shown in FIG. 9, a color image imaging apparatus 300 is a 3CCD-type imaging apparatus and has a photographic lens 310, color separation prism 320, and three monochrome imaging devices (CCD image sensors) 331, 332, and 333.

The color separation prism 320 comprises three prisms, i.e., the first, second, and third prisms in the order of incidence of light. A dichroic coating which reflects only a blue (B) component is applied to the light beam exit surface of a first prism 321 while a dichroic coating which reflects only a red (R) component is applied to the light beam exit surface of a second prism 322.

Out of light beams incident on the color separation prism 320 through the photographic lens 310, a B component is reflected by the light beam exit surface of the first prism 321. The reflected light with the B component is totally reflected by the incident surface of the first prism 321, emitted from the exit surface for the B channel, and imaged on the CCD image sensor 331.

The remaining light beams without the B component pass through the first prism 321 and come incident on the second prism 322. Only an R component is reflected by the dichroic coating of the light beam exit surface of the second prism 322. The reflected light with the R component is totally reflected by the incident surface of the second prism 322, emitted from the exit surface for the R channel of the second prism 322, and imaged on the CCD image sensor 332.

The remaining green (G) component is emitted from the exit surface for the G channel of the third prism 323 and is imaged on the CCD image sensor 333.

R image data, B image data, and G image data can be acquired from the CCD image sensors 331 to 333. These RGB image data are temporarily stored in image memory (not shown), and then any color shift in the image data of the color planes is corrected. Since a color image color shift correction method in the color image imaging apparatus 300 is the same as that in the field sequential color image imaging apparatus 10, a description thereof will be omitted.

In the case of a 3CCD-type imaging apparatus, high positional accuracy is demanded in bonding three CCD image sensors to a color separation prism. Manual adjustment work for obtaining high positional accuracy requires much time and labor, thus resulting in an increase in cost. With a color image color shift correction method according to the present invention, the accuracy in bonding the three CCD image sensors only needs to fall within a certain range. This makes it possible to automate the work of bonding the three CCD image sensors and implement a reduction in cost. With the present invention, even if each CCD image sensor changes upon time due to an adhesive, impact, or the like, a color image can be kept at high quality, free from any color shift.

Note that although in this embodiment, whether the color of a pixel is imaginary is determined using a CIELAB chromaticity diagram, the present invention is not limited to this. For example, a CIExy chromaticity diagram may be used. A color filter apparatus in a field sequential color image imaging apparatus is not limited to that in the embodiment shown in FIG. 1. Any may be used as long as it can be used for field sequential color imaging.

In this embodiment, a three-color field sequential method (RGB, CMY, or XYZ color filters) has been explained. The present invention can also be applied to a system which obtains the reflectance distribution of an object using color band-pass filters of six colors or more. If the reflectance is calculated from six or eight color data, and XYZ and CIELAB data are obtained, imaginary-color points can be calculated like the method of this embodiment.

What is claimed is:

1. Color shift correction method of a color image using an imaging apparatus comprising the steps of:
   (a) a step of imaging an object and acquiring image data of each of a plurality of color planes including planes of primaries;
   (b) a step of determining whether a color of each of pixels of color image data obtained by combining the image data of each of the plurality of color planes is imaginary, wherein an imaginary color is a color outside the optimal range for a color space;
   (c) a step of counting the number of pixels determined in the step (b) to have imaginary color and calculating the number of pixels within one frame which have imaginary color;
   (d) a step of repeating a process of performing a pixel shift operation, relative to the image data of each of the plurality of color planes, for the image data of the remaining color planes and performing the steps (b) and (c) using the image data of each of the plurality of color planes having undergone the pixel shift operation, and obtaining, out of the pixel shift operations relative to the image data of the color planes, a pixel shift operation for the color planes in which the number of pixels which have imaginary color is the minimum; and
   (e) a step of correcting the image data of the plurality of color planes acquired in the step (a) on the basis of the pixel shift operation obtained in the step (d) using the imaging apparatus.

2. The color shift correction method of the color image according to claim 1, wherein the step (a) comprises imaging the object by a monochrome imaging device while switching between color filters with respective colors and acquiring field sequential image data.

3. The color shift correction method of the color image according to claim 1, wherein the step (a) comprises separating light incident from the object into color components of the primaries through a color separation optical system and acquiring the image data of the color planes from three monochrome imaging devices on which light beams with the respective color components come incident.

4. The color image color shift correction method according to claim 1, wherein the step (b) comprises a step of transforming color image data of the pixel into data in one of an LAB colorimetric system and XYZ colorimetric system and a step of, if the transformed data in the one of the LAB colorimetric system and XYZ colorimetric system falls outside a range of an optimal color of one of a CIELAB chromaticity diagram and CIExy chromaticity diagram at a lightness of the pixel, determining that the color of the pixel is imaginary.

5. The color image color shift correction method according to claim 2, wherein the step (b) comprises a step of transforming color image data of the pixel into data in one of an LAB colorimetric system and XYZ colorimetric system and a step of, if the transformed data in the one of the LAB colorimetric system and XYZ colorimetric system falls outside a range of an optimal color of one of a CIELAB chromaticity diagram and CIExy chromaticity diagram at a lightness of the pixel, determining that the color of the pixel is imaginary.

6. The color image color shift correction method according to claim 3, wherein the step (b) comprises a step of transforming color image data of the pixel into data in one of an LAB colorimetric system and XYZ colorimetric system and a step of, if the transformed data in the one of the LAB colorimetric system and XYZ colorimetric system falls outside a range of an optimal color of one of a CIELAB chromaticity diagram and CIExy chromaticity diagram at a lightness of the pixel, determining that the color of the pixel is imaginary.

7. A color image imaging apparatus comprising:
   a monochrome imaging device;
   a color filter device which has color filters of at least primaries and sequentially switches to place one of the color filters onto a photographing optical path of the monochrome imaging device;
   an imaging control device which, when imaging an object, controls the color filter device and monochrome imaging device and acquires field sequential image data;
   a storage device which temporarily stores the acquired field sequential image data for each of color planes;
   a color shift detection device which detects a color shift on an imaging surface of the monochrome imaging device on the basis of the field sequential image data stored in the storage device, the color shift detection device comprising a device which performs a pixel shift operation, relative to the field sequential image data of each of the color planes stored in the storage device, for the field sequential image data of the remaining color planes and obtains the field sequential image data having undergone the pixel shift operation, a determination device which determines whether a color of each of pixels of color image data obtained by combining the field sequential image data having undergone the pixel shift operation is imaginary, wherein an imaginary color is a color outside the optimal range for a color space, a calculation device which counts the number of pixels determined by the determination device to have imaginary color and calculates the number of pixels within one frame that have imaginary color, and a device which detects, as a color shift, a pixel shift operation in which the number of pixels calculated by the calculation device is the minimum; and a color shift correction device which corrects a color shift in the field sequential image data stored in the storage device on the basis of the color shift detected by the color shift detection device.

8. The color image imaging apparatus according to claim 7, wherein the color filter device comprises a rotary color filter disposed rotatably in front of a photographing optical system of the monochrome imaging device and a driving device which rotates the rotary color filter and stops each of the color filters on an optical axis of the photographing optical system.

9. A color image imaging apparatus comprising:

a color separation optical system which separates object light incident through a photographic lens into color components of primaries;

three monochrome imaging devices on which object light beams with the respective color components, having undergone the separation by the color separation optical system, come incident;

an imaging control device which acquires image data of the primaries from the three monochrome imaging devices;

a storage device which temporarily stores the acquired image data of the primaries for each of color planes;

a color shift detection device which detects a color shift on imaging surfaces of the three monochrome imaging devices on the basis of the image data of each of the color planes stored in the storage device, the color shift detection device comprising a device which performs a pixel shift operation, relative to the image data of each of the color planes stored in the storage device, for the image data of the remaining color planes and obtains the image data of each of the color planes having undergone the pixel shift operation, a determination device which determines whether a color of each of pixels of color image data obtained by combining the image data of each of the color planes having undergone the pixel shift operation is imaginary, wherein an imaginary color is a color outside the optimal range for a color space, a calculation device which counts the number of pixels determined by the determination device to have imaginary color and calculates the number of pixels within one frame that have imaginary color, and a device which detects, as a color shift, a pixel shift operation in which the number of pixels calculated by the calculation device is the minimum; and a color shift correction device which corrects a color shift in the image data of each of the color planes stored in the storage device on the basis of the color shift detected by the color shift detection device.

10. The color image imaging apparatus according to claim 7, wherein the determination device of the color shift detection device comprises a data transformation device which transforms color image data of the pixel into data in one of an LAB colorimetric system and XYZ colorimetric system and a device which, if the transformed data in the one of the LAB colorimetric system and XYZ colorimetric system falls outside a range of an optimal color of one of a CIELAB chromaticity diagram and CIExy chromaticity diagram at a lightness of the pixel, determines that the color of the pixel is imaginary.

11. The color image imaging apparatus according to claim 8, wherein the determination device of the color shift detection device comprises a data transformation device which transforms color image data of the pixel into data in one of an LAB colorimetric system and XYZ colorimetric system and a device which, if the transformed data in the one of the LAB colorimetric system and XYZ colorimetric system falls outside a range of an optimal color of one of a CIELAB chromaticity diagram and CIExy chromaticity diagram at a lightness of the pixel, determines that the color of the pixel is imaginary.

12. The color image imaging apparatus according to claim 9, wherein the determination device of the color shift detection device comprises a data transformation device which transforms color image data of the pixel into data in one of an LAB colorimetric system and XYZ colorimetric system and a device which, if the transformed data in the one of the LAB colorimetric system and XYZ colorimetric system falls outside a range of an optimal color of one of a CIELAB chromaticity diagram and CIExy chromaticity diagram at a lightness of the pixel, determines that the color of the pixel is imaginary.

* * * * *